US011941167B2

(12) United States Patent
Wu

(10) Patent No.: US 11,941,167 B2
(45) Date of Patent: Mar. 26, 2024

(54) HEAD-MOUNTED VR ALL-IN-ONE MACHINE

(71) Applicant: QINGDAO PICO TECHNOLOGY CO., LTD, Qingdao (CN)

(72) Inventor: Tao Wu, Beijing (CN)

(73) Assignee: QINGDAO PICO TECHNOLOGY CO., LTD, Qingdao (CN)

( * ) Notice: Subject to any disclaimer, the term of this patent is extended or adjusted under 35 U.S.C. 154(b) by 0 days.

(21) Appl. No.: 18/037,304

(22) PCT Filed: Nov. 4, 2021

(86) PCT No.: PCT/CN2021/128629
§ 371 (c)(1),
(2) Date: May 16, 2023

(87) PCT Pub. No.: WO2022/105613
PCT Pub. Date: May 27, 2022

(65) Prior Publication Data
US 2023/0418370 A1 Dec. 28, 2023

(30) Foreign Application Priority Data
Nov. 17, 2020 (CN) .......................... 202011286249.5

(51) Int. Cl.
*G06F 3/01* (2006.01)
*G02B 27/00* (2006.01)
(Continued)

(52) U.S. Cl.
CPC .......... *G06F 3/012* (2013.01); *G02B 27/0093* (2013.01); *G02B 27/0101* (2013.01);
(Continued)

(58) Field of Classification Search
CPC ..... G06F 3/012; G06F 3/013; G02B 27/0093; G02B 27/017; G02B 27/0179;
(Continued)

(56) References Cited

U.S. PATENT DOCUMENTS 8,970,452 B2 * 3/2015 Wheeler ............ G02B 27/0176
345/8
10,268,438 B2 * 4/2019 Chen .................... G02B 27/017
(Continued)

FOREIGN PATENT DOCUMENTS

| CN | 105183147 A | 12/2015 |
|---|---|---|
| CN | 106599811 A | 4/2017 |

(Continued)

OTHER PUBLICATIONS

International Patent Application No. PCT/CN2021/128629; Int'l Search Report, dated Jan. 28, 2022; 2 pages.

*Primary Examiner* — Vinh T Lam
(74) *Attorney, Agent, or Firm* — BakerHostetler

(57) ABSTRACT

A head-mounted VR all-in-one machine comprises a front cover plate. Four first tracking cameras are arranged on an outer side frame of the front cover plate, two second tracking cameras are respectively arranged at positions on an inner side of the front cover plate that are close to the left eye and the right eye of a user, and a third tracking camera is arranged at a position on the lower bottom of the front cover plate that is close to the mouth of the user, wherein the four first tracking cameras and an IMU sensor form a 6DoF user head tracking module, the two second tracking cameras form a user eyeball tracking module, the two second tracking cameras and the one third tracking camera form a user facial expression recognition module, and the four first tracking cameras form a user bare hand recognition tracking module in a multiplexed manner.

18 Claims, 2 Drawing Sheets

(51) Int. Cl.
*G02B 27/01* (2006.01)
*G06V 40/16* (2022.01)

(52) U.S. Cl.
CPC ....... *G02B 27/017* (2013.01); *G02B 27/0179* (2013.01); *G06F 3/013* (2013.01); *G06V 40/174* (2022.01); *G02B 2027/0138* (2013.01); *G02B 2027/014* (2013.01); *G02B 2027/0187* (2013.01)

(58) Field of Classification Search
CPC ...... G02B 2027/0138; G02B 2027/014; G02B 2027/0187; G06V 40/174
See application file for complete search history.

(56) References Cited

U.S. PATENT DOCUMENTS

| | | | | |
|---|---|---|---|---|
| 10,299,717 B2 * | 5/2019 | Tzvieli | | H04N 5/33 |
| 10,429,656 B1 * | 10/2019 | Sharma | | G02B 17/023 |
| 10,473,941 B2 * | 11/2019 | Shen | | G02B 27/0172 |
| 10,504,243 B2 * | 12/2019 | Linde | | G06T 7/292 |
| 10,506,217 B2 * | 12/2019 | Linde | | G03B 37/04 |
| 10,523,852 B2 * | 12/2019 | Tzvieli | | G01J 5/0025 |
| 10,524,696 B2 * | 1/2020 | Tzvieli | | A61B 5/742 |
| 10,845,606 B1 * | 11/2020 | Sharma | | G02B 27/286 |
| 10,848,745 B2 * | 11/2020 | Linde | | H04N 13/25 |
| 10,859,843 B1 * | 12/2020 | Tempel | | G02B 27/0093 |
| 10,921,881 B2 * | 2/2021 | Hudman | | G06F 3/0346 |
| 10,936,051 B2 * | 3/2021 | Iyer | | G02B 27/017 |
| 11,009,964 B2 * | 5/2021 | Erivantcev | | G06F 3/011 |
| 11,042,034 B2 * | 6/2021 | Sztuk | | G06F 3/013 |
| 11,079,999 B2 * | 8/2021 | Chen | | A63F 13/212 |
| 11,128,817 B2 * | 9/2021 | Bleyer | | H04N 23/11 |
| 11,156,830 B2 * | 10/2021 | Johnson | | G06T 19/006 |
| 11,199,705 B2 * | 12/2021 | Stafford | | G06F 3/011 |
| 11,327,318 B2 * | 5/2022 | Lin | | G02B 27/0093 |
| 11,561,392 B2 * | 1/2023 | Grahsl | | G02B 27/0101 |
| 11,565,190 B2 * | 1/2023 | Zhang | | G06F 3/011 |
| 11,625,841 B2 * | 4/2023 | Wu | | G06F 3/0304 382/103 |
| 11,640,201 B2 * | 5/2023 | Wu | | G06F 3/013 345/156 |
| 11,715,176 B2 * | 8/2023 | Wu | | G06F 3/011 345/428 |
| 11,740,690 B2 * | 8/2023 | Chandrasekhar | | G06F 3/011 345/156 |
| 11,782,272 B2 * | 10/2023 | Wu | | G06F 3/0304 345/8 |
| 11,797,083 B2 * | 10/2023 | Wu | | H04N 23/90 |
| 2015/0169054 A1 * | 6/2015 | Wheeler | | G02B 27/0093 345/156 |
| 2016/0027218 A1 * | 1/2016 | Salter | | G02B 27/0093 345/633 |
| 2016/0180574 A1 | 6/2016 | Kaminitz et al. | | |
| 2018/0004478 A1 * | 1/2018 | Chen | | A63F 13/26 |
| 2018/0217663 A1 * | 8/2018 | Chandrasekhar | | G06F 3/0346 |
| 2019/0220090 A1 * | 7/2019 | Hudman | | G09G 5/003 |
| 2019/0286406 A1 * | 9/2019 | Chen | | G06F 3/1454 |
| 2020/0089311 A1 | 3/2020 | Chou et al. | | |
| 2020/0166761 A1 * | 5/2020 | Shen | | G06F 1/163 |
| 2022/0382386 A1 * | 12/2022 | Wu | | G06V 20/20 |
| 2022/0392264 A1 * | 12/2022 | Wu | | G06V 20/647 |
| 2023/0001283 A1 * | 1/2023 | Wu | | A63B 71/0622 |
| 2023/0119687 A1 * | 4/2023 | Wu | | G06F 3/0304 345/156 |

FOREIGN PATENT DOCUMENTS

| | | |
|---|---|---|
| CN | 108282648 A | 7/2018 |
| CN | 109643145 A | 4/2019 |
| CN | 111175972 A | 5/2020 |
| CN | 111696140 A | 9/2020 |
| CN | 111709302 A | 9/2020 |
| CN | 211603736 U | 9/2020 |
| CN | 112416125 A | 2/2021 |
| JP | H09-138367 A | 5/1997 |
| WO | WO 2018/224847 A2 | 12/2018 |

* cited by examiner

HEAD-MOUNTED VR ALL-IN-ONE MACHINE

CROSS-REFERENCE

The present application is the U.S. National Stage of International Application No. PCT/CN2021/128629, filed on Nov. 4, 2021, which claims priority to Chinese patent application with the application number of 202011286249.5, filed on Nov. 17, 2020, and titled "HEAD-MOUNTED VR ALL-IN-ONE MACHINE", the disclosures of which are hereby incorporated by reference in their entireties.

TECHNICAL FIELD

The present application relates to the field of head-mounted display technology, specifically to a head-mounted VR (Virtual Reality) all-in-one machine.

BACKGROUND

Existing mainstream head-mounted VR all-in-one machines generally have the following problems: 1. Most of them employ an inside-out 6DoF (Six Degree of Freedom) tracking scheme based on two tracking cameras, which limits the tracked field of view (FOV). 2. They are unable to provide user's eye tracking information, that is, cannot perform some special processing operations such as foveated rendering to reduce power consumption caused by a rendering load. 3. They are unable to provide user's expression tracking information, and cannot be used in some scenarios that require user facial expression information, which will reduce user's immersion in virtual scenarios. 4. Additional gesture recognition trackers are required in some virtual scenario where users interact naturally through bare hands to increase complexity of structural design.

SUMMARY

In view of this, the main objective of the present application is to provide a head-mounted VR all-in-one machine, which solves problems of 6DoF tracking, eye movement tracking, user facial expression recognition, and bare hand recognition and tracking of existing head-mounted VR all-in-one machines at the same time through computer vision technology and visual tracking technology.

The present application provides a head-mounted VR all-in-one machine, internally equipped with an IMU (Inertial Measurement Units) sensor, comprising a front cover plate, wherein four first tracking cameras are disposed on an outer frame of the front cover plate, two second tracking cameras, one is disposed near user's left eyes on an inner side of the front cover plate and another is disposed near user's right eyes on the inner side of the front cover plate, and a third tracking camera is disposed near user's mouth at a bottom of the front cover plate, wherein the four first tracking cameras and the IMU sensor constitute a user head 6DoF tracking module, the two second tracking cameras constitute a user eye tracking module, the two second tracking cameras and the third tracking camera constitute a user facial expression recognition module, and the four first tracking cameras are multiplexed to constitute a user bare hand recognition and tracking module.

The technical solution of the present application can achieve the following beneficial effects:

In the head-mounted VR all-in-one machine according to the embodiment of the present application, a plurality of cameras are disposed at different positions of the front cover plate, and these cameras are combined or multiplexed to constitute a user head 6DoF tracking module, a user eye tracking module, a user facial expression recognition module, and a user bare hand recognition and tracking module respectively, so that the head-mounted VR all-in-one machine can solve problems of 6DoF tracking, eye movement tracking, user facial expression recognition, and bare hand recognition and tracking at the same time, reduce inconvenience of user experience to a great extent, and greatly improve immersion of the user experience.

BRIEF DESCRIPTION OF THE DRAWINGS

Various other advantages and benefits will become apparent to those of ordinary skill in the art by reading the detailed description of the preferred embodiment below. The accompanying drawings are used for the purpose of illustrating the preferred embodiment only and are not considered to be limiting to the present application. Moreover, throughout the accompanying drawings, the same reference symbols are used to indicate the same components. In the accompanying drawings.

DETAILED DESCRIPTION OF PREFERRED EMBODIMENTS

Exemplary embodiments of the present application are described in greater detail below with reference to the accompanying drawings. These embodiments are provided to enable a more thorough understanding of the present application and to enable the complete scope of the present application to be communicated to those skilled in the art. Although exemplary embodiments of the present application are shown in the accompanying drawings, it should be understood that the present application can be implemented in various forms and should not be limited by the embodiments set forth herein.

To simultaneously solve problems of 6DoF tracking, eye movement tracking, user facial expression recognition, and bare hand recognition and tracking of a head-mounted VR all-in-one machine, a plurality of cameras are disposed at different positions of a front cover plate, and these cameras are combined or multiplexed to constitute a user head 6DoF tracking module, a user eye tracking module, a user facial expression recognition module, and a user bare hand recognition and tracking module respectively, so as to reduce inconvenience of user experience to a great extent and greatly improve immersion of the user experience.

Figure 1:
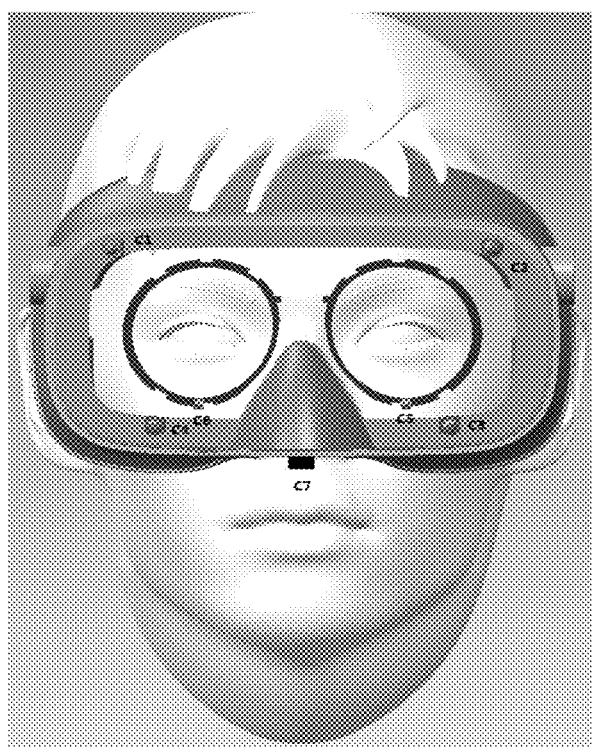
FIG. 1 shows an exterior schematic diagram of a head-mounted VR all-in-one machine according to an embodiment of the present application.

FIG. 1 shows an exterior schematic diagram of a head-mounted VR all-in-one machine according to an embodiment of the present application. With reference to FIG. 1, the head-mounted VR all-in-one machine in the embodiment of the present application is internally equipped with an IMU sensor (not shown in FIG. 1) and includes a front cover plate. Four first tracking cameras (C1, C2, C3, C4) are disposed on an outer frame of the front cover plate, two second tracking cameras (C5, C6), one is disposed near user's left eyes on an inner side of the front cover plate and another is disposed near user's right eyes on the inner side of the front cover plate, and a third tracking camera (C7) is disposed near user's mouth at a bottom of the front cover plate.

The four first tracking cameras (C1, C2, C3, C4) and the internal IMU sensor constitute a user head 6DoF tracking module, the two second tracking cameras (C5, C6) constitute a user eye tracking module, the two second tracking cameras (C5, C6) and the third tracking camera (C7) constitute a user facial expression recognition module, and the four first tracking cameras (C1, C2, C3, C4) are multiplexed to constitute a user bare hand recognition and tracking module.

In one embodiment of the present application, the four first tracking cameras (C1, C2, C3, C4) are all monochrome cameras. The monochrome cameras capture black and white images. To solve 6DOF tracking and positioning in user's head, the cameras only need to capture light and dark information in the environment, instead of color information. Therefore, the monochrome cameras will not affect tracking and positioning accuracy, and can reduce user experience costs.

In one embodiment of the present application, the two second tracking cameras (C5, C6) and the third tracking camera (C7) are also monochrome cameras. Similarly, in order to track user's eye movement and mouth movement, the cameras only need to capture light and dark information in the environment, instead of color information. Therefore, the monochrome cameras will also not affect the accuracy of tracking user's eye movement and mouth movement, and can further reduce the costs.

In one embodiment of the present application, the cameras disposed on the front cover plate are of the same specification, namely, the four first tracking cameras (C1, C2, C3, C4), the two second tracking cameras (C5, C6), and the third tracking camera (C7) are of the same specification. This not only avoids the trouble of distinguishing cameras when the head-mounted VR all-in-one machine is produced and assembled, but also facilitates synchronous control on all the cameras in the head-mounted VR all-in-one machine.

In one embodiment of the present application, the four first tracking cameras (C1, C2, C3, C4) are two-by-two axisymmetrically disposed at four corners of the outer frame of the front cover plate, with different placement angles. Through integrated design on the placement angles and positions of the four first tracking cameras (C1, C2, C3, C4), the four first tracking cameras (C1, C2, C3, C4) may be spliced into a larger field of view (FOV) for tracking, thereby ensuring the tracking accuracy and stability of head 6DoF.

In one embodiment of the present application, the four first tracking cameras (C1, C2, C3, C4) are fixed at setting positions of the outer frame of the front cover plate, but are rotatable at certain angles. For example, a vertical coordinate system is established with a center of the head-mounted VR all-in-one machine as an origin of the coordinate system, where an X-axis represents a horizontal direction, a Y-axis represents a vertical direction, and a Z-axis represents a front-back direction. Each first tracking camera (C1, C2, C3, C4) may rotate up and down within a certain angle range around the X-axis, and rotate left and right within a certain angle range around the Y-axis. When the head-mounted VR all-in-one machine is tracked for 6DoF or a user's bare hand is recognized and tracked, the rotation angles of the one or more first tracking cameras (C1, C2, C3, C4) are controlled to improve the tracking field of view FOV, so as to improve the robustness and accuracy of 6DoF tracking on user's head.

In one embodiment of the present application, each camera has a diagonal field of view (FOV-D) of at least 150° or more and a frame rate of more than 30 Hz and employs global shutter exposure, and its lens can transmit visible light (in a band range of 480 nm-670 nm) and 850 nm infrared light.

In one embodiment of the present application, the four first tracking cameras (C1, C2, C3, C4) are spliced into at least one 230°*210° horizontal*vertical (H*V) field of view. Range data of the field of view is computed through general algorithm simulation. The tracking accuracy and stability of 6DoF can be substantially guaranteed within this range. A user who wears the head-mounted all-in-one machine can walk and rotate freely in a real scenario. The four first tracking cameras (C1, C2, C3, C4) scan an external environment at the same time, and are combined with the internal IMU sensor of the head-mounted VR all-in-one machine to compute 6DoF tracking information (position information and posture information) of the user's head in real time.

Figure 2:
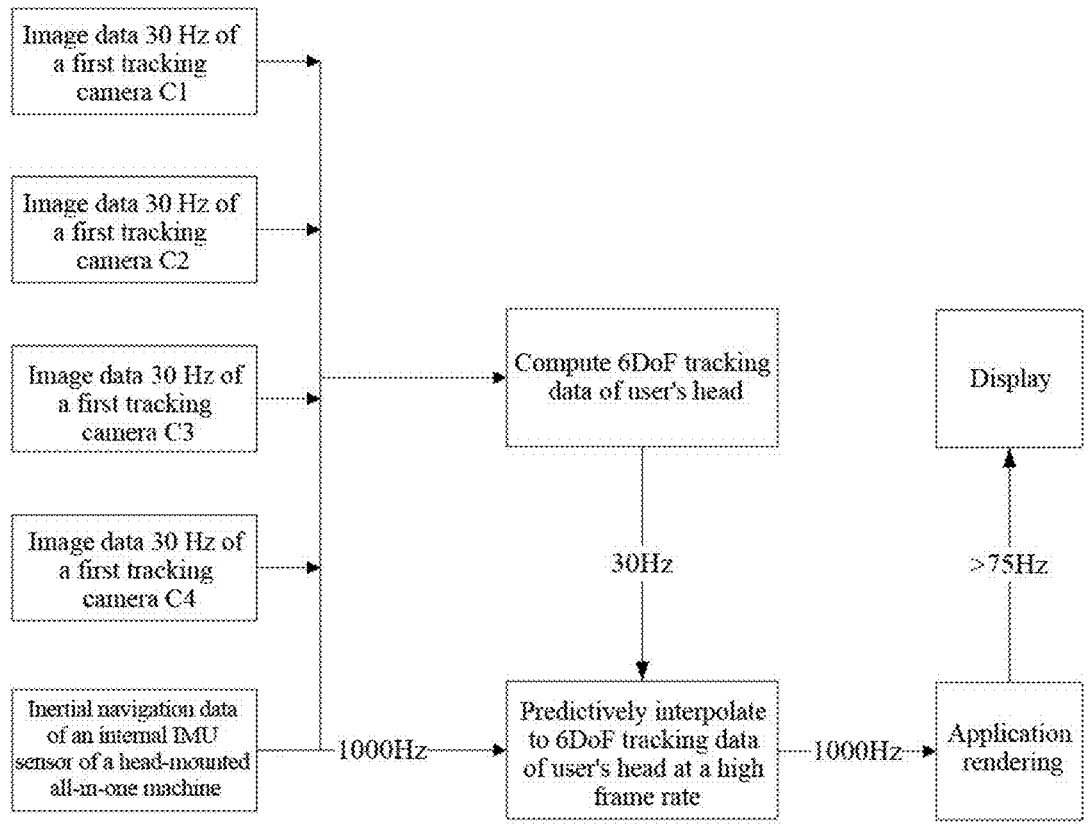
FIG. 2 shows a schematic diagram of an implementation framework for user head 6DoF tracking according to an embodiment of the present application.

FIG. 2 shows a schematic diagram of an implementation framework for user head 6DoF tracking according to an embodiment of the present application. As shown in FIG. 2, five data need to be collected in real time in the embodiment of the present application, including image data from the four first tracking cameras (C1, C2, C3, C4) and inertial navigation data from the internal IMU sensor of the head-mounted VR all-in-one machine.

In one embodiment of the present application, the user head 6DoF tracking module is configured to: first, compute 6DoF tracking data of user's head in a 3D space in real time according to each frame of image data of the four first tracking cameras (C1, C2, C3, C4) (a shooting frame rate of each camera is, for example, 30 Hz) and in combination with inertial navigation data of the internal IMU sensor at current time; then predictively interpolate the 6DoF tracking data of the user's head in the 3D space at the current shooting frame rate (30 Hz) to the same frame rate (namely, 1000 Hz) of the IMU sensor in real time in combination with the inertial navigation data of the IMU sensor at the current time at a high frame rate (for example, 1000 Hz, which is determined by the sampling performance of the IMU sensor); and finally, display and output the predictively interpolated 6DoF tracking data of the user's head in the 3D space at a frame rate greater than 75 Hz after application rendering.

In order to provide a user with certain immersion and reduce user's dizziness, the head-mounted VR all-in-one machine needs to have a display frame rate of at least 75 Hz. Therefore, the frame rate greater than 75 Hz is used for display and output in the embodiment of the present application, which can ensure user's immersion and reduce user's dizziness.

It should be noted that the four first tracking cameras (C1, C2, C3, C4) are physically synchronized. Through a physical synchronization mechanism, center points of the four cameras in an exposure time period of each frame may be controlled to be the same, that is, the four cameras are controlled to accurately perform synchronous exposure.

In one embodiment of the present application, the user eye tracking module is configured to: obtain user's eye movement tracking data according to each frame of image data of the two second tracking cameras (C5, C6) and human eye annotation data, so as to perform, according to the user's eye movement tracking data, high-resolution rendering on a virtual scenario region gazed by user's eyes and low-resolution rendering on other regions. Then, the resource rendering capability of the head-mounted VR all-in-one machine is optimized without reducing user experience, while the load and power consumption resources of the system are reduced.

User's virtual facial expression experience is required in some B side (Business, commercial or enterprise level) usage scenarios, and a user's virtual facial expression is mainly generated through user's eye movement and mouth movement. The two functions are mainly implemented by the tracking cameras C5, C6, and C7 disposed on the front cover plate of the head-mounted VR all-in-one machine, where C5 and C6 mainly track eye movement, and C7 mainly tracks mouth movement.

In one embodiment of the present application, the user facial expression recognition module is configured to: obtain user's eye movement tracking data according to each frame of image data of the two second tracking cameras (C5, C6) and human eye annotation data, obtain user's mouth movement tracking data according to each frame of image data of the third tracking camera (C7) and mouth annotation data, and recognize a user's facial expression in combination with the user head 6DoF tracking data and according to the user's eye movement tracking data and mouth movement tracking data at the same time.

Specifically, the two second tracking cameras (C5, C6) and the third tracking camera (C7) may be calibrated first through a conventional Zhang Zhengyou calibration method.

To track user's eye movement, 16 annotation positions and a total of 32 annotation points are annotated on the left and right eyes, a semi-supervised convolutional neural network model is trained to generate an eye tracking model 1, then the 32 annotation points on the left and right eyes are detected and recognized through the model 1 according to each frame of image data of the left and right eyes captured by the two second tracking cameras (C5, C6) in real time to obtain image coordinate data of the 32 annotation points in real time, and the image coordinate data are normalized to obtain 2D positions of the 32 eye tracking annotation points.

To track user's mouth movement, a similar process is used. 10 annotation points are annotated on the mouth, a semi-supervised convolutional neural network model is trained to generate a mouth tracking model 2, then the 10 annotation points on the mouth are detected and recognized through the model 2 according to the image data of the mouth captured by the third tracking camera (C7) in real time to obtain image coordinate data of the 10 annotation points in real time, and the image coordinate data are normalized to obtain 2D positions of the 10 mouth tracking annotation points.

Finally, combined with motion and rotation pose data of the user's head (6DoF tracking data of the user's head), the normalized 2D mouth and 2D eye position data are fused, the image coordinate positions of the 42 annotation points on the mouth and eyes are mapped to spatial three-dimensional coordinates of corresponding annotation positions of a virtual 3D face, and the user's facial expression may be recognized according to the spatial three-dimensional coordinates of the corresponding annotation positions of the virtual 3D face.

In one embodiment of the present application, the user bare hand recognition and tracking module is configured to: recognize and track a position of three-dimensional bone model data of a user's hand according to each frame of image data of the four first tracking cameras (C1, C2, C3, C4) and in combination with the three-dimensional bone model data of the user's hand and the 6DoF tracking data of the user's head.

Specifically, a first tracking camera (a camera used for head pose tracking) used as an example is first trained off line to obtain a hand detection model 3 and a hand bone point recognition model 4. The hand is detected and positioned on a head tracking image of the current frame by using the hand detection model 3 to obtain a position of the hand on the image of the current frame and a corresponding region size. An ROI (Region Of Interest) of the hand in the next frame is estimated by using an ROI of the hand in the current frame through an optical flow tracking algorithm, and the tracked information is saved in a tracking queue Trackhand to provide tracking information for three-dimensional bone point recognition of the hand in the next frame. Next, the ROI of the hand on the image of the current frame is obtained from the Trackhand, and 21 bone points of the hand are recognized on the image data of the corresponding region through the hand bone point recognition model 4.

Three-dimensional bone point coordinates of the 21 bone points of each hand in the image coordinates are computed by combining obtained two-dimensional coordinates of the 21 bone points of the hand on the current image with the 6DoF tracking data of the user's head. Then, the coordinates of the 21 three-dimensional bone points of each hand are smoothed and filtered through historically corresponding three-dimensional bone point coordinates of the hand, thereby reducing a possibility of unstable recognition on a joint point of a frame, and improving position recognition accuracy and stability of three-dimensional bone points of fingers. Finally, the filtered coordinates of the 21 bone points of each hand are fused with the 6DoF tracking data of the user's head, the bone point information of the hand in the camera coordinate system is transformed into bone point data of the hand in a head-mounted coordinate system, and the bone point data are rendered and transmitted in real time back to the head-mounted all-in-one machine for displaying.

It should be noted that user bare hand recognition and tracking may be completed solely through a single first tracking camera. The use of a plurality of first tracking cameras is mainly to compensate for the inability of the single first tracking camera to capture the field of view that cannot meet requirements of user scenarios. For example, C1, C2, C3, and C4 may be spliced into a large field of view scenario that is approximately 230°*210° (H*V) or more.

In summary, a plurality of cameras are disposed at different positions of the front cover plate of the head-mounted VR all-in-one machine, and these cameras are combined or multiplexed to constitute a user head 6DoF tracking module, a user eye tracking module, a user facial expression recognition module, and a user bare hand recognition and tracking module respectively, so that the head-mounted VR all-in-one machine can solve problems of 6DoF tracking, eye movement tracking, user facial expression recognition, and bare hand recognition and tracking at the same time, reduce inconvenience of user experience to a great extent, and greatly improve immersion of the user experience.

It should be understood by those skilled in the art that the terms used in this application are intended to describe particular embodiments only, and are not intended to limit the application. The singular forms of "a", "said" and "the" as used in this application and the appended claims are also intended to include most forms, unless the context clearly indicates other meaning. It should also be understood that the term "and/or" as used herein refers to and includes any or all possible combinations of one or more associated listed items.

It should be understood that while the terms first, second, third, etc. may be used in this application to describe various information, such information should not be limited to these terms. These terms are used only to distinguish the same type of information from one another. For example, without departing from the scope of the present application, the first information may also be referred to as the second information, and similarly, the second information may also be referred to as the first information.

The above is only an example of the present application, and is not intended to limit the present application. To a person skilled in the art, the present application may have various changes and variations. Any modification, equivalent substitution, improvement, etc. made within the spirit and principle of this application shall be included in the scope of the claims of this application.

What is claimed is:

1. A head-mounted Virtual Reality (VR) device, comprising: an Inertial Measurement Units (IMU) sensor and a front cover plate, wherein four first tracking cameras are disposed on an outer frame of the front cover plate; two second tracking cameras, one is disposed near user's left eyes on an inner side of the front cover plate and another is disposed near user's right eyes on the inner side of the front cover plate; and a third tracking camera is disposed near user's mouth at a bottom of the front cover plate, wherein
the four first tracking cameras and the IMU sensor constitute a user head six Degree of Freedom (6DoF) tracking module, the two second tracking cameras constitute a user eye tracking module, the two second tracking cameras and the third tracking camera constitute a user facial expression recognition module, and the four first tracking cameras are multiplexed to constitute a user hand recognition and tracking module.

2. The head-mounted VR device according to claim 1, wherein the four first tracking cameras, the two second tracking cameras, and the third tracking camera are all monochrome cameras.

3. The head-mounted VR device according to claim 1, wherein specifications of the four first tracking cameras, the two second tracking cameras, and the third tracking camera are the same.

4. The head-mounted VR device according to claim 1, wherein the four first tracking cameras are two-by-two axisymmetrically disposed at four corners of the outer frame of the front cover plate, with different placement angles.

5. The head-mounted VR device according to claim 4, wherein the four first tracking cameras are fixed at setting positions of the outer frame of the front cover plate, but are rotatable at certain angles.

6. The head-mounted VR device according to claim 5, wherein each tracking camera has a diagonal field of view of at least 150° or more and a frame rate of more than 30 Hz and employs global shutter exposure.

7. The head-mounted VR device according to claim 1, wherein the user head 6DoF tracking module is configured to compute 6DoF tracking data of user's head in a 3D space in real time according to each frame of image data of the four first tracking cameras and in combination with inertial navigation data of the IMU sensor at current time;
predictively interpolate the 6DoF tracking data of the user's head in the 3D space at a current shooting frame rate to the same frame rate of the IMU sensor in real time in combination with the inertial navigation data of the IMU sensor at the current time; and
display and output the predictively interpolated 6DoF tracking data of the user's head in the 3D space at a frame rate greater than 75 Hz after application rendering.

8. The head-mounted VR device according to claim 1, wherein the user eye tracking module is configured to obtain user's eye movement tracking data according to each frame of image data of the two second tracking cameras and human eye annotation data, so as to perform, according to the user's eye movement tracking data, high-resolution rendering on a virtual scenario region gazed by user's eyes and low-resolution rendering on other regions.

9. The head-mounted VR device according to claim 1, wherein the user facial expression recognition module is configured to obtain user's eye movement tracking data according to each frame of image data of the two second tracking cameras and human eye annotation data, obtain user's mouth movement tracking data according to each frame of image data of the third tracking camera and mouth annotation data, and recognize a user's facial expression in combination with the user head 6DoF tracking data and according to the user's eye movement tracking data and mouth movement tracking data at the same time.

10. The head-mounted VR device according to claim 1, wherein the user bare hand recognition and tracking module is configured to recognize and track a position of three-dimensional bone model data of a user's hand according to each frame of image data of one or more of the first tracking cameras and in combination with the three-dimensional bone model data of the user's hand and the 6DoF tracking data of the user's head.

11. The head-mounted VR device according claim 2, wherein the user head 6DoF tracking module is configured to compute 6DoF tracking data of user's head in a 3D space in real time according to each frame of image data of the four first tracking cameras and in combination with inertial navigation data of the IMU sensor at current time;
predictively interpolate the 6DoF tracking data of the user's head in the 3D space at a current shooting frame rate to the same frame rate of the IMU sensor in real time in combination with the inertial navigation data of the IMU sensor at the current time; and
display and output the predictively interpolated 6DoF tracking data of the user's head in the 3D space at a frame rate greater than 75 Hz after application rendering.

12. The head-mounted VR device according claim 3, wherein the user head 6DoF tracking module is configured to compute 6DoF tracking data of user's head in a 3D space in real time according to each frame of image data of the four first tracking cameras and in combination with inertial navigation data of the IMU sensor at current time;
predictively interpolate the 6DoF tracking data of the user's head in the 3D space at a current shooting frame rate to the same frame rate of the IMU sensor in real time in combination with the inertial navigation data of the IMU sensor at the current time; and
display and output the predictively interpolated 6DoF tracking data of the user's head in the 3D space at a frame rate greater than 75 Hz after application rendering.

13. The head-mounted VR device according to claim 2, wherein the user eye tracking module is configured to obtain user's eye movement tracking data according to each frame of image data of the two second tracking cameras and human eye annotation data, so as to perform, according to the user's eye movement tracking data, high-resolution rendering on a virtual scenario region gazed by user's eyes and low-resolution rendering on other regions.

14. The head-mounted VR device according to claim 3, wherein the user eye tracking module is configured to obtain user's eye movement tracking data according to each frame of image data of the two second tracking cameras and human eye annotation data, so as to perform, according to the user's eye movement tracking data, high-resolution rendering on a virtual scenario region gazed by user's eyes and low-resolution rendering on other regions.

15. The head-mounted VR device according to claim 2, wherein the user facial expression recognition module is configured to obtain user's eye movement tracking data according to each frame of image data of the two second tracking cameras and human eye annotation data, obtain user's mouth movement tracking data according to each frame of image data of the third tracking camera and mouth annotation data, and recognize a user's facial expression in combination with the user head 6DoF tracking data and according to the user's eye movement tracking data and mouth movement tracking data at the same time.

16. The head-mounted VR device according to claim 3, wherein the user facial expression recognition module is configured to obtain user's eye movement tracking data according to each frame of image data of the two second tracking cameras and human eye annotation data, obtain user's mouth movement tracking data according to each frame of image data of the third tracking camera and mouth annotation data, and recognize a user's facial expression in combination with the user head 6DoF tracking data and according to the user's eye movement tracking data and mouth movement tracking data at the same time.

17. The head-mounted VR device according to claim 2, wherein the user bare hand recognition and tracking module is configured to recognize and track a position of three-dimensional bone model data of a user's hand according to each frame of image data of one or more of the first tracking cameras and in combination with the three-dimensional bone model data of the user's hand and the 6DoF tracking data of the user's head.

18. The head-mounted VR device according to claim 3, wherein the user bare hand recognition and tracking module is configured to recognize and track a position of three-dimensional bone model data of a user's hand according to each frame of image data of one or more of the first tracking cameras and in combination with the three-dimensional bone model data of the user's hand and the 6DoF tracking data of the user's head.

* * * * *